United States Patent
Francis et al.

(10) Patent No.: US 6,600,418 B2
(45) Date of Patent: Jul. 29, 2003

(54) OBJECT TRACKING AND MANAGEMENT SYSTEM AND METHOD USING RADIO-FREQUENCY IDENTIFICATION TAGS

(75) Inventors: Robert C. Francis, Maplewood, MN (US); James P. McGee, Cedar, MN (US); Robert A. Sainati, Bloomington, MN (US); Richard L. Sheehan, Jr., Stillwater, MN (US); Sai-Kit K. Tong, Roseville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/735,243

(22) Filed: Dec. 12, 2000

(65) Prior Publication Data

US 2002/0070862 A1 Jun. 13, 2002

(51) Int. Cl.[7] .............................................. G08B 13/14
(52) U.S. Cl. .................. 340/572.1; 340/5.92; 340/10.1; 340/505; 700/215; 700/226; 700/229; 705/28
(58) Field of Search .............................. 340/572.1, 505, 340/10.1, 5.92, 988; 235/385; 705/22, 28; 700/213, 214, 215, 216, 217, 225, 226, 228, 229

(56) References Cited

U.S. PATENT DOCUMENTS

| | | | |
|---|---|---|---|
| 4,471,345 A | 9/1984 | Barrett, Jr. .................. | 340/572 |
| 4,688,026 A | 8/1987 | Scribner et al. ............ | 340/572 |
| 4,773,807 A | 9/1988 | Kroll et al. .................. | 414/282 |
| 4,827,395 A * | 5/1989 | Anders et al. ....... | 340/572.1 X |
| 4,862,160 A | 8/1989 | Ekchian et al. ............. | 340/825 |
| 4,990,841 A | 2/1991 | Elder .......................... | 318/587 |
| 5,019,815 A | 5/1991 | Lemelson et al. .......... | 340/933 |
| 5,063,380 A | 11/1991 | Wakura ...................... | 340/825 |

(List continued on next page.)

FOREIGN PATENT DOCUMENTS

| | | | |
|---|---|---|---|
| BE | 1005103 A3 | 4/1993 | |
| DE | 43 41 880 A1 | 6/1995 | ........... G07C/11/00 |
| DE | 44 39 914 A1 | 5/1996 | ........... B65D/23/08 |

(List continued on next page.)

OTHER PUBLICATIONS

Hornak, J.P.; "Auto ID . . . putting the control in inventory control"; Industrial Engineering; Norcross; Aug. 1994 (2 pgs.).

Finkenzeller; "RFID Handbook—Radio–Frequency Identification Fundamentals and Applications"; 1999, pp. 227–273.

d'Hont, Susan; "Features—Smart pallet system improves warehouse productivity"; Sensor Review; vol. 16, No. 4, 1996, pp. 21–24.

(List continued on next page.)

*Primary Examiner*—Thomas Mullen
(74) *Attorney, Agent, or Firm*—Melissa E. Buss

(57) ABSTRACT

An object tracking and management system and method using radio-frequency identification ("RFID") tags is disclosed. Objects to be moved between locations are outfitted with RFID tags having information relating to the identities of the objects. The locations are also marked by RFID tags containing information on the locations. A transport vehicle for moving the objects is equipped with an RFID interrogator capable of detecting signals from the RFID tags. An onboard processor provides the operator of the vehicle with instructions on the movement of objects. The processor also determines the identities of the objects and locations from the detected signals and provides the operator with feedback as to the identity of an object being moved, the location of the vehicle and any error in carrying out the instructions. Numerous variations of the basic system and method using RFID tags are also described.

26 Claims, 10 Drawing Sheets

U.S. PATENT DOCUMENTS

| | | | |
|---|---|---|---|
| 5,113,349 A | 5/1992 | Nakamura et al. | 364/478 |
| 5,151,684 A | 9/1992 | Johnsen | 340/572 |
| 5,153,842 A | 10/1992 | Dlugos, Sr. et al. | 364/478 |
| 5,218,344 A | 6/1993 | Ricketts | 340/573 |
| 5,406,263 A | 4/1995 | Tuttle | 340/572 |
| 5,434,775 A | 7/1995 | Sims et al. | 364/403 |
| 5,448,220 A | 9/1995 | Levy | 340/539 |
| 5,457,629 A | 10/1995 | Miller et al. | 364/424 |
| 5,521,601 A | 5/1996 | Kandlur et al. | 342/44 |
| 5,539,775 A | 7/1996 | Tuttle et al. | 375/200 |
| 5,541,585 A | 7/1996 | Duhame et al. | 340/572 |
| 5,557,280 A | 9/1996 | Marsh et al. | 342/44 |
| 5,565,858 A | 10/1996 | Guthrie | 340/825 |
| 5,574,372 A | 11/1996 | Moritz et al. | 324/318 |
| 5,613,228 A | 3/1997 | Tuttle et al. | 455/127 |
| 5,635,693 A | 6/1997 | Benson et al. | 235/384 |
| 5,640,002 A | 6/1997 | Ruppert et al. | 235/472 |
| 5,648,765 A | 7/1997 | Cresap et al. | 340/825 |
| 5,662,048 A | 9/1997 | Kralj et al. | 108/56.3 |
| 5,682,142 A | 10/1997 | Loosmore et al. | 340/572 |
| 5,689,238 A | 11/1997 | Cannon, Jr. et al. | 340/568 |
| 5,689,239 A | 11/1997 | Turner et al. | 340/572 |
| 5,699,066 A | 12/1997 | Marsh et al. | 342/44 |
| 5,708,423 A * | 1/1998 | Ghaffari et al. | 340/572.4 X |
| 5,712,789 A | 1/1998 | Radican | 364/478 |
| 5,729,697 A | 3/1998 | Schkolnick et al. | 395/223 |
| 5,739,765 A | 4/1998 | Stanfield et al. | 340/825 |
| 5,745,036 A | 4/1998 | Clare | 340/572 |
| 5,774,876 A * | 6/1998 | Woolley et al. | 705/28 |
| 5,780,826 A | 7/1998 | Hareyama et al. | 235/385 |
| 5,786,764 A | 7/1998 | Engellenner | 340/572 |
| 5,798,693 A | 8/1998 | Engellenner | 340/505 |
| 5,801,628 A | 9/1998 | Maloney | 340/568 |
| 5,804,810 A | 9/1998 | Woolley et al. | 235/492 |
| 5,821,513 A | 10/1998 | O'Hagan et al. | 235/383 |
| 5,850,187 A | 12/1998 | Carrender et al. | 340/825 |
| 5,853,846 A | 12/1998 | Clark et al. | 428/131 |
| 5,859,586 A | 1/1999 | Sasagawa et al. | 340/572 |
| 5,883,582 A | 3/1999 | Bowers et al. | 340/825 |
| 5,886,634 A * | 3/1999 | Muhme | 340/572.1 |
| 5,887,176 A | 3/1999 | Griffith et al. | 395/750 |
| 5,920,261 A | 7/1999 | Hughes et al. | 340/572 |
| 5,920,287 A * | 7/1999 | Belcher et al. | 342/450 |
| 5,926,110 A | 7/1999 | Downs et al. | 340/825 |
| 5,929,760 A * | 7/1999 | Monahan | 340/572.7 |
| 5,933,354 A | 8/1999 | Shimada et al. | 364/478 |
| 5,936,527 A | 8/1999 | Isaacman et al. | 340/572 |
| 5,953,234 A | 9/1999 | Singer et al. | 364/478 |
| 5,959,568 A | 9/1999 | Woolley | 342/42 |
| 5,963,134 A | 10/1999 | Bowers et al. | 340/572 |
| 5,970,398 A | 10/1999 | Tuttle | 455/193 |
| 5,971,592 A | 10/1999 | Kralj et al. | 364/478 |
| 6,032,127 A | 2/2000 | Schkolnick et al. | 705/23 |
| 6,075,441 A | 6/2000 | Maloney | 340/568 |
| 6,076,023 A | 6/2000 | Sato | 700/214 |
| 6,081,237 A | 6/2000 | Sato et al. | 343/713 |
| 6,097,301 A | 8/2000 | Tuttle | 340/593 |
| 6,148,291 A | 11/2000 | Radican | 705/28 |
| 6,150,921 A | 11/2000 | Werb et al. | 340/10.1 |
| 6,154,137 A | 11/2000 | Goff et al. | 340/572 |
| D435,557 S | 12/2000 | Eisenberg et al. | D14/428 |
| 6,166,638 A | 12/2000 | Brady et al. | |
| 6,182,053 B1 | 1/2001 | Rauber et al. | 705/28 |
| 6,232,870 B1 * | 5/2001 | Garber et al. | 340/10.1 |
| 6,335,686 B1 * | 1/2002 | Goff et al. | 340/572.4 |
| 6,496,806 B1 | 12/2002 | Horwitz et al. | |
| 2002/0057192 A1 | 5/2002 | Eagleson et al. | |
| 2002/0070862 A1 | 6/2002 | Francis et al. | |

FOREIGN PATENT DOCUMENTS

| | | | |
|---|---|---|---|
| DE | 295 12 791 U1 | 8/1996 | G06F/19/00 |
| DE | 200 04 869 U1 | 9/2000 | B65G/37/02 |
| EP | 0 450 212 A1 | 10/1991 | G06F/15/24 |
| EP | 0 494 114 A2 | 7/1992 | G07C/9/00 |
| EP | 0 585 132 A1 | 3/1994 | G01S/13/78 |
| EP | 0 615 136 A2 | 9/1994 | G01S/13/02 |
| EP | 0 689 161 A2 | 12/1995 | G06K/17/00 |
| EP | 0 748 083 A1 | 12/1996 | H04L/12/28 |
| EP | 0 789 254 A2 | 8/1997 | G01S/13/02 |
| FR | 2 697 801 | 5/1994 | B65D/19/22 |
| GB | 2 288 299 | 10/1995 | |
| GB | 2 302 088 A | 1/1997 | B65G/1/137 |
| GB | 2 306 726 A | 5/1997 | G08C/15/06 |
| GB | 2 333 207 A | 7/1999 | G06K/7/10 |
| JP | 5-85545 | 4/1993 | B65D/19/31 |
| JP | 8-108911 | 4/1996 | B65G/1/137 |
| JP | 9-254983 | 9/1997 | B65D/19/38 |
| JP | 10-250730 | 9/1998 | B65D/19/00 |
| JP | 10-305997 | 11/1998 | B66F/9/24 |
| JP | 10-338312 | 12/1998 | B65G/1/137 |
| NL | 9400091 | 9/1995 | A01K/11/00 |
| NL | 9401836 | 6/1996 | G06K/19/00 |
| WO | WO 89/04016 | 5/1989 | G06F/15/24 |
| WO | WO 96/16231 | 5/1996 | E01F/9/00 |
| WO | WO 97/09687 | 3/1997 | G06F/17/60 |
| WO | WO 97/50057 | 12/1997 | G06M/1/12 |
| WO | WO 98/13800 | 4/1998 | G08B/13/14 |
| WO | WO 98/23412 | 6/1998 | B25B/13/00 |
| WO | WO 98/34204 | 8/1998 | |
| WO | WO 99/05660 | 2/1999 | G08B/13/14 |
| WO | WO 99/17767 | 4/1999 | A61K/31/35 |
| WO | WO 99/17857 | 4/1999 | A63H/33/10 |
| WO | WO 99/38136 | 7/1999 | |
| WO | WO 99/67737 | 12/1999 | G06K/7/00 |
| WO | WO 00/10122 | 2/2000 | G06K/17/00 |
| WO | WO 00/10144 | 2/2000 | G08B/13/24 |
| WO | WO 00/13123 | 3/2000 | G06F/17/60 |
| WO | WO 00/19392 | 4/2000 | G08C/17/02 |
| WO | WO 00/43944 | 7/2000 | |
| WO | WO 02/11062 | 2/2002 | |

OTHER PUBLICATIONS

Web article "MATRICS™ The Future of RFID Today—Applications" from website of www.matricsrfid.com; pp. 1–4; 2001.

Web article "Texas Instruments RFID—Logistics/Supply Chain Applications" from website of www.ti.com; 2 pgs.; 2000.

d'Hont, Susy; "The Cutting Edge of RFID Technology and Applications for Manfacturing and Distribution"; from website www.isit.com; pp. 1–11; Jan. 31, 2002.

Booklet entitled "Distribution Center Management—Strategies & Tactics for Distribution Center & Warehouse Excellence"; vol. 37, No. 3, Mar., 2002; Alexander Communication Group, Inc.; 8 pgs.

IDSystems website article entitled "RFID: What's It Worth to You?"Sep. 1999 (4 pgs.).

Texas Instruments RFID Products website "Forging New Pathways, Making New Connections" Case Study—Protecting Valuable Products During Distribution—2000 (2 pgs.).

Texas Instruments RFID Products website "Forging New Pathways, Making New Connections" Case Study—Smart Pallet Systems—2000 (1 pg.).

ISIT website article entitled "Put Your Finger On Warehouse Productivity Gains" 1996–2001 (3 pgs.).

Article entitled "RFID Helps Xerox Achieve 100% Shipping Accuracy" from TI RFID News International Newsletter, Issue 20, 2000 (1 pg).

Brochure from Intermec entitled "Intellitag® Questions & Answers" 1999 (8 pgs).

Article from The Institution of Electrical Engineers entitled "Applications of RFID Technology" by Raza et al.; 1999 (5 pgs).

Article entitled "Hot Technologies—Smart Tags for Tracking Parts and Products" from Fortune Jun. 26, 2000 (4 pgs).

Article entitled "Money well spent" from Frontline Solutions Jun. 2000 (4 pgs).

Article entitled "The Jury's Out in the case for RFID in logistics" from Frontline Solutions Jun. 2000 (9 pgs).

Article from Frontline Solutions Website entitled "Radio tags for supply chain logistics"; Colin Milner; from Automatic ID News Europe Jan./Feb. 1999 (10 pgs).

Article entitled "Case Studies—Superdrug's Wireless Warehouse" from RF innovations Issue 1 May/Jun. 1998 (3 pgs).

Article entitled "Case Studies—Healthcare Giant's Wound Management—Centre Gets Real–Time Wireless Treatment" from RF innovations Issue 8 Jun./Jul. 2000 (4 pgs).

Article entitled "Stay on Track" from Manufacturing Systems website; May 2000 (7 pgs).

Article from IDSystems website entitled "Welcome to the Intelligent Warehouse" including 2 sidebar articles; Sep. 1999 (21 pgs).

* cited by examiner

OBJECT TRACKING AND MANAGEMENT SYSTEM AND METHOD USING RADIO-FREQUENCY IDENTIFICATION TAGS

TECHNICAL FIELD

The present invention relates generally to object tracking and management systems and methods, and more specifically to such systems and methods that use a combination of mobile and/or stationary radio-frequency identification tags to identify, monitor the locations of, and direct movements of objects.

BACKGROUND OF THE INVENTION

To achieve highly efficient warehouse operations, it is desirable to accurately track the movements of pallet loads and other objects to be located and/or transferred within the warehouse as they are transported to and from various locations, such as storage locations, stocking locations, staging areas and loading docks. In typical conventional warehouse management operations, the operator of a transport vehicle, such as a fork truck, reach truck, lift truck or pallet truck, receives a set of printed stocking or picking orders, typically generated by a computer, and executes the orders by visually identifying the loads and locations and transporting the loads to and from the locations specified on the orders. In such a system, especially in large-scale warehouses with a large number of locations and loads to handle, there are numerous opportunities for errors.

Some warehouse management operations use bar codes which are affixed to the loads or which mark specific locations. In a typical example of such a system, the operator uses a hand-held bar code scanner to read the bar code on the loads and, in some cases, on the stock locations. Although such a system is an improvement over purely visual processes, it can be difficult to completely implement, due partly to the need for direct line of sight, close proximity, and proper alignment between the scanner and barcodes. It also requires the operator to participate in the load-identification process. In some case, the operator may need to exit the transport vehicle to scan the barcodes manually, slowing down warehouse operations. Certain locations, for example high storage shelves and loading docks, often are particularly difficult places for using bar codes because of the need for close proximity between the codes and the reader. As a result, loads in those areas are often visually identified instead.

Radio-frequency identification ("RFID") tag systems have been proposed for use in inventory tracking. In such a system, an RFID tag is attached to an object or location, and contains a non-volatile memory for storing information identifying the object or location and electronic circuitry for interacting with an interrogator. RFID tags may be passive or active. In the case of a passive RFID tag, the tag includes circuitry for converting at least a portion of the received RF signals into electrical power needed by the tag for signal processing and transmission. In a typical conventional system, RFID tags containing information associated with the identities of inventory items to be tracked are attached to the inventory items. An RFID interrogator is used to detect the presence of an RFID tag and read the identification information from the tag. A typical RFID interrogator includes an RF transceiver for transmitting interrogation signals to and receiving response signals from RFID tags, one or more antennae connected to the transceiver, and associated decoders and encoders for reading and writing the encoded information in the received and transmitted RF signals, respectively. The interrogator may be a portable device, which can be brought near the tags to be read, or it may be a stationary device, which reads the tags as they are brought to the interrogator, as in the case of tagged library books being returned to a return station that is fitted with an interrogator. RFID tags may also be affixed near a location as a location marker. After detecting both a tag attached to an inventory item and a location marking tag, a processing unit associated with the interrogator may determine that the inventory item is positioned near the tagged location. While these conventional object tracking systems are capable of keeping a record of the inventory items and sometimes their locations, they are not effective for tracking and/or managing the movement of the inventory items.

There also exist warehouse inventory tracking systems that include fixed RFID interrogators at various locations to detect RFID-tagged items when they are positioned near the interrogator-equipped locations. For example, there are warehouses with RFID interrogators positioned at or near the loading dock gates. Such systems are capable of tracking the arrival of tagged items at the various locations, but are not capable of detecting errors remote to these locations. For example, if a fork truck picked up a wrong load because the truck was driven to a wrong pick-up location, the error would not be detected until the load had reached the gate. This delayed error detection negatively impacts the overall efficiency of warehouse operations. Additionally, outfitting each of the numerous loading dock gates with an interrogator is not cost effective.

It is desirable to provide a system that provides full automation to the process of object identification, movement and tracking throughout a warehouse or other similar environment. There is a need for such a system that is adaptable for use with all of the wide variety of locations that are involved in warehouse operations, such as stocking locations, storage racks, floor lanes, and shipping docks. There is a need for such a system that operates in conjunction with a central data repository to direct and track all object movement throughout the entire warehouse.

The present invention is directed to alleviating one or more of the aforementioned problems, and meeting one or more of the above-identified needs.

SUMMARY OF THE INVENTION

The invention provides for an automated object and location identification system, preferably for use in warehouse management operations, without the need to outfit numerous locations with fixed RFID interrogators. In one embodiment of the invention, a transport vehicle, such as a fork truck or reach truck, has mounted thereon an RFID interrogator. RFID tags are attached to objects (such as pallets and loads) and to locations (such as a storage location, pass-through location, or loading dock). In the case of a pallet, the information transmitted from the tag may include the identity of the pallet, the weight of the pallet, and an identification of the items on the pallet. In the case of a location, the information is indicative of the location, such as a location code or coordinates. The RFID interrogator transmits interrogation signals to the RFID tags. Each of the RFID tags transmits a signal encoded with the information particular to the tag in response to the interrogation signals when the vehicle is sufficiently close to the tag, though not necessarily within a direct line of sight.

A processor is operatively linked to the RFID interrogator for processing the signal received from the tags by the interrogator and determining the identity of the load and position of the detected location RFID tag. The processor may be located on board the vehicle, at a remote site, or at a combination of both.

RFID tags are preferably used on both the objects and the locations. Alternatively, an identification marker such as a barcode tag may be attached to the objects, while RFID tags are used at one or more locations. In this case, the interrogator on the transport vehicle also includes a barcode scanner for reading information stored in the barcode tags. Similarly, RFID tags may be used on the objects, while barcode tags are used at locations, such as alongside a loading dock door.

Preferably, the processor provides the operator with feedback information through a user interface on the identity of the object, the location where the object is positioned and the location to which the object is to be moved. For example, the processor may transmit an audible signal (such as a beep) or a visual signal (such as red or green lights or graphical display on a monitor) to the operator to inform the operator whether the correct object has been picked up or whether the object has been positioned at the correct location. The processor may further be configured to send instructions to the operator on the tasks to be performed.

The interrogator may also be instructed by the processor to send information, such as the movement history of an object, to the RFID tag on the object. The RFID tag stores the information, which may be subsequently read, for example, by an RFID interrogator at another site. Similarly, the interrogator may be instructed by the processor to send information to the RFID tag at a location, which is then stored by the location tag.

In another embodiment of the invention, the interrogator is capable of identifying, and thus reading information only from, the tag that is the closest in distance to the interrogator. This is accomplished by dynamically reducing the power in the interrogation signal until only the RFID tag closest to the interrogator responds. The probability of incorrectly identifying a location or object is thereby reduced.

In this embodiment of the invention, the processor may generate a signal, perceptible by the operator, which is indicative of the minimum interrogation signal strength required to detect the RFID tag being sought by the interrogator (the target RFID tag). The minimum interrogator signal strength may be represented as a confidence level (the lower the minimum signal strength, the higher the confidence level) or as an approximate distance between the tag and the interrogator (the lower the minimum signal strength, the shorter the distance.)

In another embodiment of the invention, a pass-through location, such a loading dock gate or a truck docked at the loading dock gate, is marked by an RFID assembly having two RFID tags spaced in close proximity to each other. An RF shield, such as a metal plate or metal screen, is positioned between the two tags. When the interrogator is on one side of the shield, only the tag that is on the same side of the shield as the interrogator responds to the interrogation signals. This arrangement thus enables the system to determine the direction of movement of an object relative to the pass-through location. For example, the system is able to determine whether the vehicle carrying the object has moved through the gate from inside the warehouse to the loading dock or from the loading dock into the warehouse.

In another embodiment of the invention, the transport vehicle is equipped with an RFID interrogator for object identification and optionally for location identification. Objects, and possibly locations, are marked with RFID tags. In addition, the warehouse floor is equipped with magnetic tape segments that provide magnetic signals indicative of the locations of the segments. The vehicle is additionally equipped with a magnetic signal reader for detecting the magnetic signals from the tape. The processor onboard the vehicle is operatively connected to both the RFID interrogator and the magnetic signal reader for determining the identities of the objects and optionally locations from the signals received from the interrogator and locations from the signals from the tape reader.

In another embodiment of the invention, the transport vehicle is of a "reach truck" type, equipped with a lift mechanism capable of positioning an object at a plurality of heights. The vehicle is further equipped with a height sensor linked to the lift mechanism for generating a signal indicative of the height that the object is positioned by the lift. The signal indicative of the height could be electrical, visual, audible, magnetic, electromagnetic or another type of signal. This embodiment of the invention is particularly useful when loading or unloading objects from a vertical column of warehouse slots. In this embodiment, it is necessary to associate only a single location tag with the column, and the system can identify the correct slot within the column using the height sensor.

Thus, in one aspect of the invention, a system for tracking an object positionable at a plurality of locations includes: (a) a transport vehicle to move the object to and from any one of the plurality of locations; (b) an object marker associated with the object which stores information indicative of the identity of the object; (c) a plurality of location markers, each of which is positioned at one of the plurality of locations and stores information indicative of the location of the marker; (d) an interrogator, including a radio frequency transmitter and receiver, mounted on the transport vehicle to receive from the object marker the information indicative of the identity of the object and from the location markers the information indicative of the location of the markers; and (e) a processor, operatively connected to the interrogator. The processer determines the identity of the object from the information indicative of the identity of the object, the location of at least one of the location markers from the information indicative of the location of the marker and the spatial relationship between the object and the location. For example, the simplest form of such determination of spatial relationship is to determine that the object is located near or at a tagged location when the RFID tags of the object and the location are detected at substantially the same time.

The processor is also preferably capable of providing instructions to the operator through a user interface regarding movement of the objects. These instructions may include (a) feedback as to whether a desired object has been identified; (b) directions to a desired location; and (c) feedback as to whether the object has been brought to a desired location.

In the system above, the transmitter of the interrogator preferably is capable of transmitting a signal encoded with information, such as the movement history of the object or the storage history of the location, and the object or location marker stores the encoded information.

The system also preferably includes a signal generator operatively connected to the processor to provide to the operator of the vehicle a signal through a user interface, such as an audible beep or visual display of lights or computer monitor display, indicative of the location of one of the plurality of location markers when the interrogator receives from the location marker the information indicative of the location of the marker.

In another aspect of the invention, the RFID interrogator is configured and arranged to read information only from the RFID tag closest to the interrogator. This is preferably accomplished by dynamically reducing the output power of the interrogation signals until only the RFID tag the closest to the interrogator responds to the interrogation signals. A target confidence indicator is preferably included to provide visual feedback of the tracking process.

In another aspect of the invention, at least one of the location markers defines a plane, and the marker transmits a first signal indicating that the interrogator is located on one side of the plane and transmits a second signal, different from the first signal, indicating that the interrogator is located on the other side of the plane. The location marker may include two RFID tags separated by a shield, such as a metal plate or screen positioned generally in the plane, wherein only the RFID tag positioned on the same side of the plane as the interrogator responds to the interrogation signals from the interrogator.

Another aspect of the invention is a system for tracking an object positionable at a plurality of locations on a traffic-bearing surface. The system includes a transport vehicle to move the object between locations, an object marker associated with the object which stores information indicative of the identity of the object, and an interrogator mounted on the vehicle to receive from the object marker the information indicative of the identity of the object. The system further includes a strip of magnetic tape adhered to the traffic-bearing surface. The magnetic tape includes a plurality of segments. Each of the segments is encoded with information indicative of the location of the segments, and produces a magnetic signal encoded with the information indicative of the location of the segment. A magnetic signal reader is mounted on the vehicle for sensing the signals generated by the magnetic tape. A processor operatively connected to the interrogator and the magnetic signal reader determines the identity of the object from the information indicative of the identity of the object, the location of at least one of the segments of the magnetic tape and the spatial relationship between the object and the location.

Another aspect of the invention is a transport vehicle for moving an object having a radio-frequency identification tag attached thereon to or from locations at a particular height. The vehicle includes: (a) a radio-frequency identification interrogator to receive a signal from the tag; (b) a lift capable of positioning the object at a plurality of heights; (c) a height sensor to generate a signal indicative of the height at which the object is positioned; (d) means for generating a signal indicative of the horizontal location of the vehicle; and (e) a processor operatively connected to the interrogator, height sensor and signal generating means. The processor determines the identity of the object from the signal received from the tag, determines the height of the object from the signal received from the height sensor, and determines the horizontal location of the vehicle from the signal generating means.

Another aspect of the invention is a method of managing an object to be moved between locations in an environment. A first RFID tag is affixed to the object and has stored therein and capable of transmitting signals encoded with information indicative of the identity of the object. A second RFID tag is affixed at a location and has stored therein and capable of transmitting signals encoded with information indicative of the location of the second tag. A transport vehicle is equipped with an RFID interrogator, capable of receiving the signals from the tags and determining the information stored in a tag. The method includes the steps of: (a) using the interrogator to receive the information indicative of the identity of the object; (b) determining a proposed location to which the object is to be moved; (c) using the vehicle to move the object to a location; (d) using the interrogator to receive the information indicative of the location; and (e) depositing the object at the location when the location indicated by the information received in step (d) matches the proposed location.

Another aspect of the present invention is a method of using an RFID interrogator with an adjustable power output level to find a target RFID tag among a plurality of radio-frequency identification tags. Each of tags is configured and arranged to transmit an identification signal in response to an interrogation signal from the interrogator. The method includes the sequential steps of: (a) transmitting interrogation signals at a power output level; (b) determining whether the target tag has been detected by the interrogator; (c) reducing the power output level if the target tag is detected; (d) repeating steps (a)–(c), each time using the power output level reached at step (c) of the previous repetition as the power output level in step (a) until the target tag is no longer detected; and (e) transmitting an interrogation signal at the power output level reached at the end of repetition immediately previous to the last repetition in (d).

BRIEF DESCRIPTION OF THE DRAWINGS

Other objects and advantages of the invention will become apparent upon reading the following detailed description of specific embodiments and upon reference to the drawings in which.

DETAILED DESCRIPTION OF THE INVENTION

Figure 1:
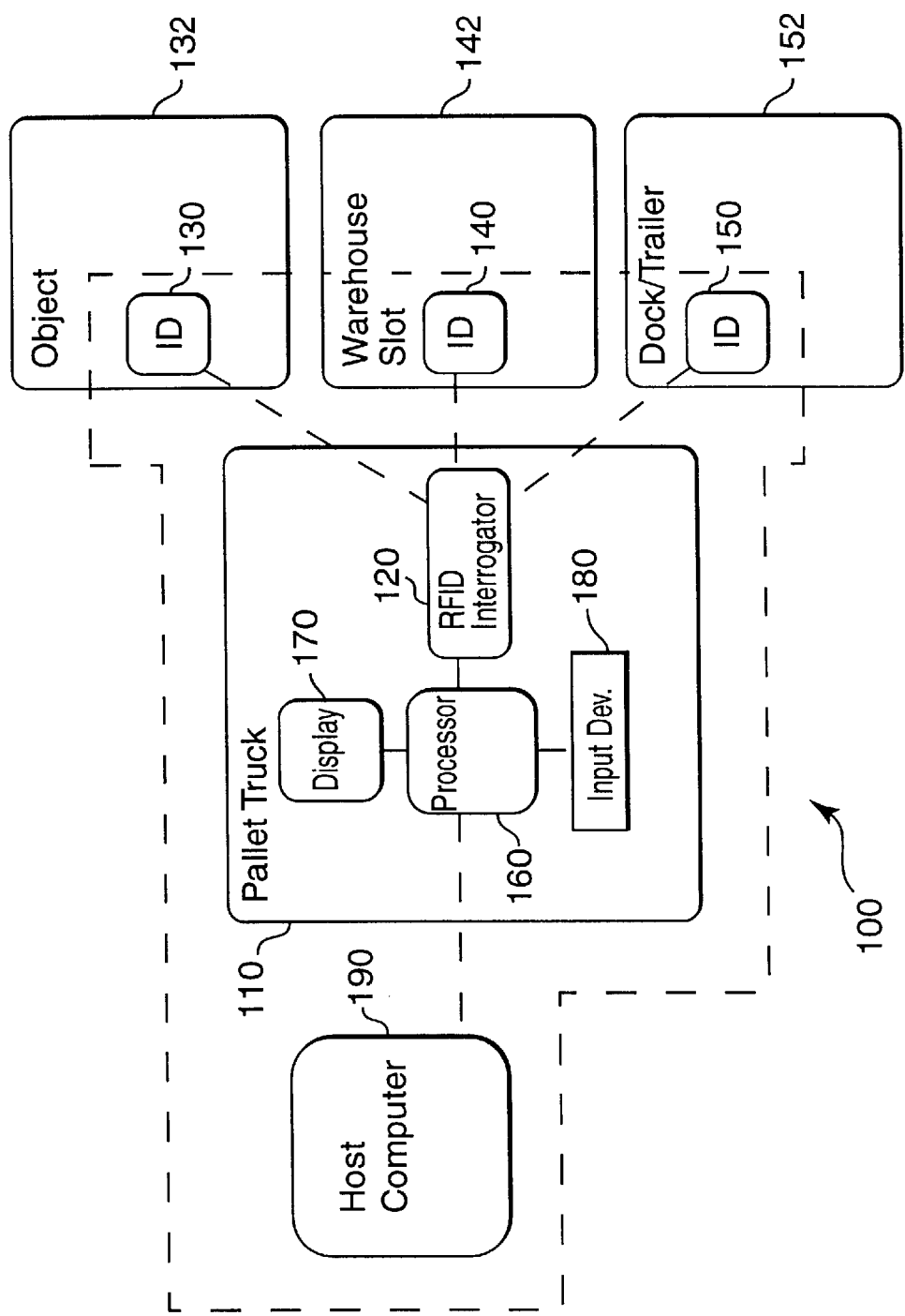
FIG. 1 illustrates an embodiment of the invention, wherein RFID tags are affixed to both the objects and locations.

Referring to FIG. 1, the object tracking and warehouse management system 100 for tracking an object 132 such as a load or pallet, includes a transport vehicle 110 such as a pallet truck, fork truck or reach truck. Onboard the vehicle 110 is mounted a interrogator 120 such as an RFID interrogator linked to a processor, which may be in the form of a computer that includes a central processing unit (CPU) 160, a display 170 and an input device 180, such as a keyboard, pointing device, and/or touch-panel display. The system further includes several markers, such as RFID tags 130, 140 and 150. An object marker such as an RFID tag 130 is attached to the object 132; the other markers, such as RFID tags 140, 150 serve as location markers and are positioned at various locations such as a stocking location (warehouse slot) 142 and loading dock 152. The processor onboard the vehicle may also be linked to a remote host computer 190 by RF link or other suitable communications system that provides a continuous link between the vehicle processor and the host computer. Host computer 190 may also be linked to the RFID interrogators and processors on other transport vehicles. The host computer 190 and the processors may also be part of a larger network of computers.

The RFID tags 130, 140 and 150, are capable of receiving, storing and transmitting information and may be of any type suitable for this purpose. The tags may include an antenna, circuitry for processing RF signals, a microprocessor and digital memory. They may be passive devices, which only transmit signals upon receiving an interrogation signal and which rely on power contained in the incoming RF waves. They may also be active devices, which continuously or periodically transmit signals and include their own power supplies. Examples of commercially available RFID tags include Intellitag® RFID tags currently available from Intermec Technologies Corporation, Everett, Wash.

The tags can store a wide variety of information about the object or location. For example, tag 130 may store a code, such as the load number or pallet number, indicative of the identity of the object. It may also store information about the movement history of the object, or about the weight of the object. Tags 140 and 150 may store information indicative of the locations, such as a loading dock number, warehouse slot number and trailer identification number. Location tags may also store other information about the location, such as the history of objects stored at the location, information about the types of objects stored at the location, or restrictions or warnings about the location.

The RFID interrogator 120 may be of any type suitable for receiving the signals. It may be an RF receiver; it may also include a transmitter for providing interrogation signals to passive RFID tags. The interrogator 120 may further be capable of transmitting information to be stored in an RFID tag. Thus, the interrogator may provide updated information about the movement history of the object or the storage history of a warehouse location. As another example, the vehicle may be equipped with a weight sensor that determines the weight of the object, in which case this information can be stored on the tag and/or compared with information already stored on the tag.

The processor may include any suitable processor, including general-or special-purpose computers. The processor preferably has a rugged design suitable for use on a moving vehicle. The display 170 may include a monitor, lights and/or a speaker or beeper. The processor may be programmed to interact with the operator through a graphical user interface. An input device 180 may include a keyboard, any suitable type of pointing device, and/or a voice recognition device. The display 170 may also be a touch-screen monitor, in which case the input device 180 is part of the monitor.

The remote computer 190 may be of any suitable type, including general-or special-purpose computers. It may also contain a database for warehouse management, storing such information as load movement histories, orders, inventory, billing records, personnel records and customer records. The content of the database may be updated from time to time with the interrogation results from the interrogator, manual input via the onboard processor by the operator, and information from the host computer through the remote link.

The transport vehicle 110 may also be equipped to interrogate RFID tags located at a number of different locations (such as heights) relative to the vehicle 110 and/or tags communicating at different frequencies (for example, tags for inventory items may use a different frequency than those for locations). This versatility may be achieved by connecting multiple antennas, each having a different orientation, to an interrogator, or mounting multiple RFID interrogators, each with its own frequency, on the same vehicle.

Figure 2A:
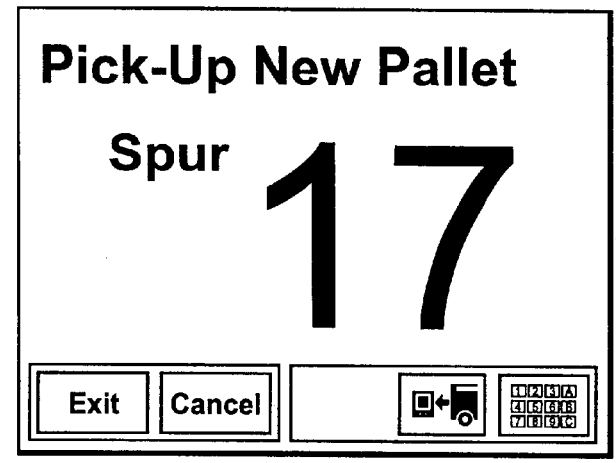
FIGS. 2(a), 2(b) and 2(c) illustrate a monitor display of an on-board interrogator at various stages of completing a load-relocation task.
Figure 2B:
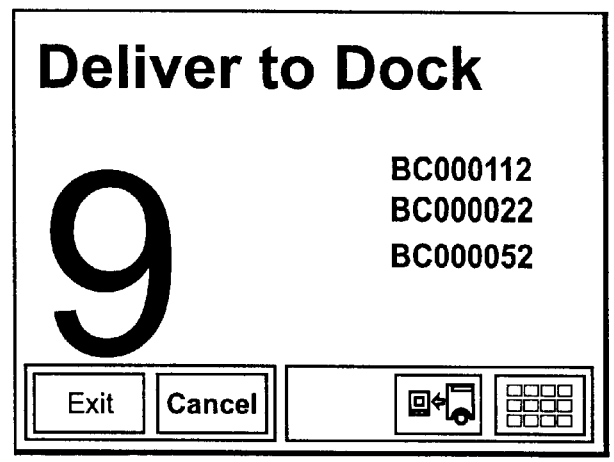
Figure 2C:
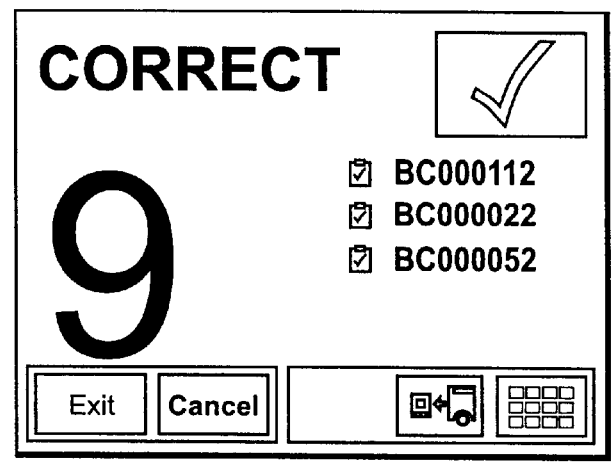

In an illustrative application of the invention, consider a warehouse where items arrive at the warehouse to be distributed to various destinations, are moved along a main conveyer belt, and then are passed on to different spurs, at the end of which pallets are assembled. The operator of the transport vehicle 110 reads from the display 170 the instructions from the remote computer 190 to pick up a pallet 132 at the end of a particular spur 142. See FIG. 2(a). The operator drives the vehicle 110 to the specified warehouse location 142 and approaches a pallet. The interrogator 120 interrogates the tag 140, which transmits a signal encoded with the location information. The interrogator detects the signal, which is sent to the processor for determination of whether the vehicle 110 has approached the correct location. When the processor confirms that the location is correct, the processor then identifies the pallet 132 by interrogating the tag 130 using the interrogator 120. The tag 130 transmits a signal encoded with a pallet number. The signal received by the interrogator 120 is processed by the processor. If the pallet number is correct, the operator proceeds to pick up the pallet 132. The processor then instructs the operator to move the pallet to the loading dock 152 (FIG. 2(b)). At the loading dock 152, a location confirmation process similar to that for the starting location 142 is carried out. If the vehicle has arrived at the correct loading dock, the operator receives a confirmation that the vehicle has come to the correct loading dock (FIG. 2(c)). If the operator has taken the pallet to a wrong location, the processor will send messages to the display 170 indicating the error. The processor may additionally instruct the operator how to reach the correct location by displaying a map and/or a set of directions. The use of RFID tags and associated computer system thus facilitates easy and essentially instant identification and confirmation of load and location. Any operator error with respect to the identity, location and movement of the load is immediately identified and corrective action may be immediately taken. The chances for errors associated with visual inspection are thus greatly reduced.

During or at the end of the above sample process, the processor onboard the vehicle 110 may transmit the status of the object and other related information to the host computer 190. The processor may also write the updated movement history and/or the status of the pallet 132 to the RFID tag 130. Such information may be used subsequently by the tracking systems at the destination location, for example. Such information may be generated by the processor, received from the host computer or manually input by the operator through the input device 180.

Figure 3:
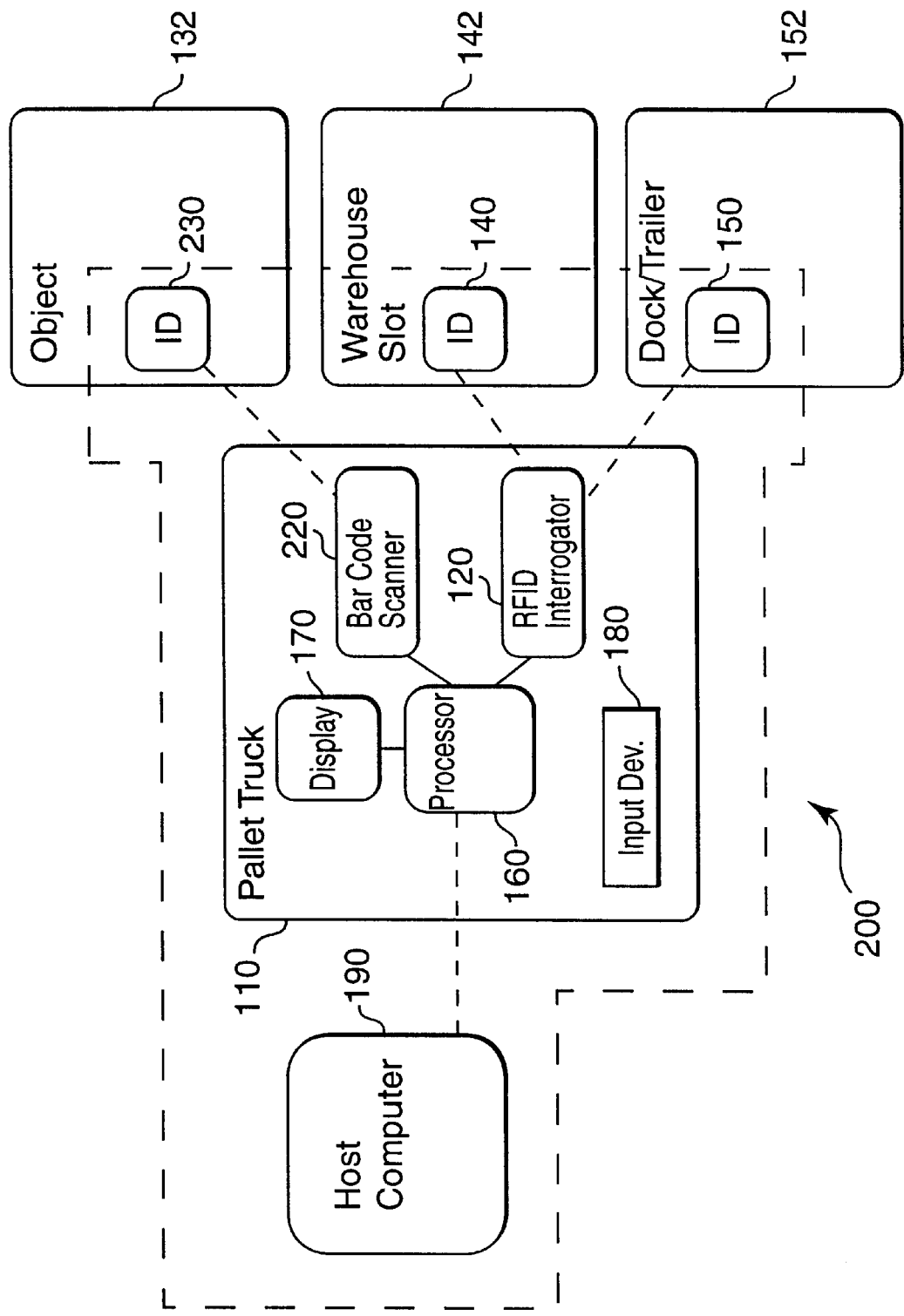
FIG. 3 illustrates another embodiment of the invention, wherein bar code labels are affixed to the objects, and RFID tags are deployed at the locations.

A modified management system 200 is shown in FIG. 3. The system is similar to the system 100 shown in FIG. 1, with the exceptions that a bar code label 230 is used for the load 132 in place of an RFID tag, and a bar code scanner 220 is used to scan bar codes on the loads or pallets. The locations are still identified by RFID tags 140 and 150. Using different types of identification markers for object and location offers additional flexibility in accommodating a wider variety of warehouse configurations and operations, including accommodating bar-coded pallets that are not tagged with RFID tags. Of course, barcodes need not be used in place of all RFID tags for loads. A mix of barcodes and RFID tags may be used for load identification purposes, thereby further increasing the range of objects the system can handle.

Motion and Direction Determination

Figure 4:
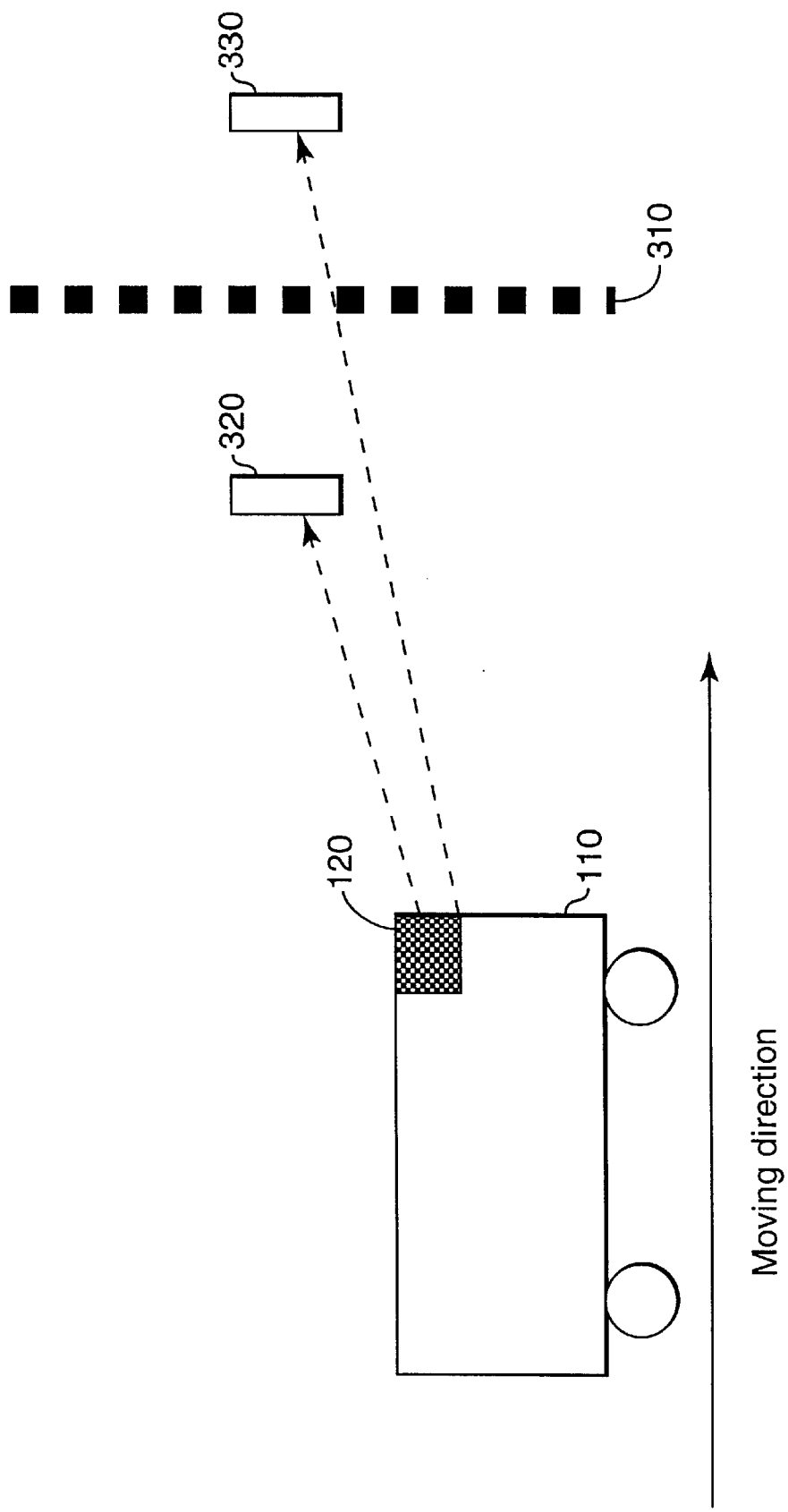
FIG. 4 illustrates one principle of determining relative position and movement using RFID tags.

In certain applications, in addition to knowing the location of a load, it is desirable to know whether and in what direction a load has moved past a particular point. For example, when a fork truck delivers a pallet to a trailer, it is often insufficient to know that the pallet has arrived at the loading dock; it is often preferable to also know whether the pallet has passed the gate of the trailer from the loading dock side. In principle, as shown in FIG. 4, it is possible to use two RFID tags 320 and 330 on either side of a plane and determine the direction of the motion of the interrogator based on which tag is detected first. But to achieve any reasonable accuracy in such determination, the two tags must be placed far apart. That is, the distance between the two tags must be large enough so that the strength of the interrogation signals fall from significantly above detection threshold to significantly below the detection threshold over the distance. Such distances are often greater than the dimension of the site (such as the warehouse trailer door) allows. Furthermore, in this scheme, the most accurate determination of motion occurs when the pallet truck is approaching the point 310 from afar, rather than when it is just passing through the point 310. Thus the measurement would not reflect the true status of the load.

Figure 5:
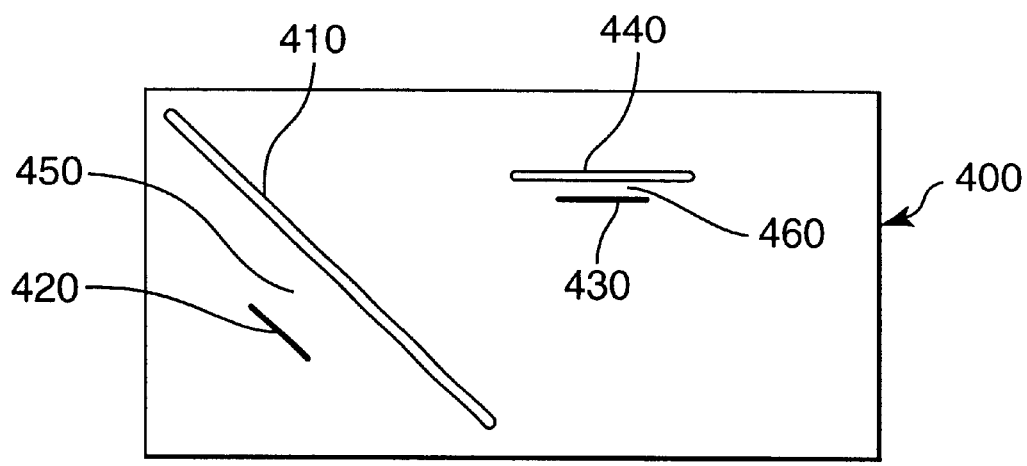
FIG. 5 illustrates an embodiment of the invention, wherein two RFID tags are positioned in close proximity to each other for detecting relative position of the transport vehicle.

To solve this problem, a preferred structure of a location marker 400 capable of detecting object movement in accordance with one aspect of the invention is illustrated in FIG. 5. It includes two RFID tags 420 and 430 spaced a short distance apart. An RF shield 410, such as a metal plate, metal screen or other RF reflective or absorbant material, is positioned between the tags. Shield 410 is preferably located at an angle (such as 45 degrees) relative to the direction of movement of the load. Gap 450, preferably of approximately one inch (2.5 cm), is defined between tag 420 and the shield to retain the sensitivity of the tag. A second metal plate 440 is preferably placed behind the second tag, and defines a second gap 460 of approximately ½ inch (1.25 cm). Plate 440 preferably reduces the maximum read distance of tag 430, so as to further ensure that only one tag can be read at any given position. The entire assembly may be enclosed in a RF transparent enclosure (not shown).

Because the RF shield blocks substantially all interrogation signals from Tag 2 430 when the transport vehicle carrying the RFID interrogator and the load is on the same side of the RF shield 410 as Tag 1 420, the interrogator will not detect Tag 2. Similarly, when the interrogator is on the same side of the shield 410 as Tag 2 430, Tag 1 420 will not be detected. It is only when the interrogator travels over a short range near the plane dividing the two tags that both tags are detected by the interrogator. Therefore, judging by the time sequence in which Tag 1 420 and Tag 2 430 are detected, the direction of movement past the plane defined by the RF shield 410 may be accurately determined.

Figure 6:
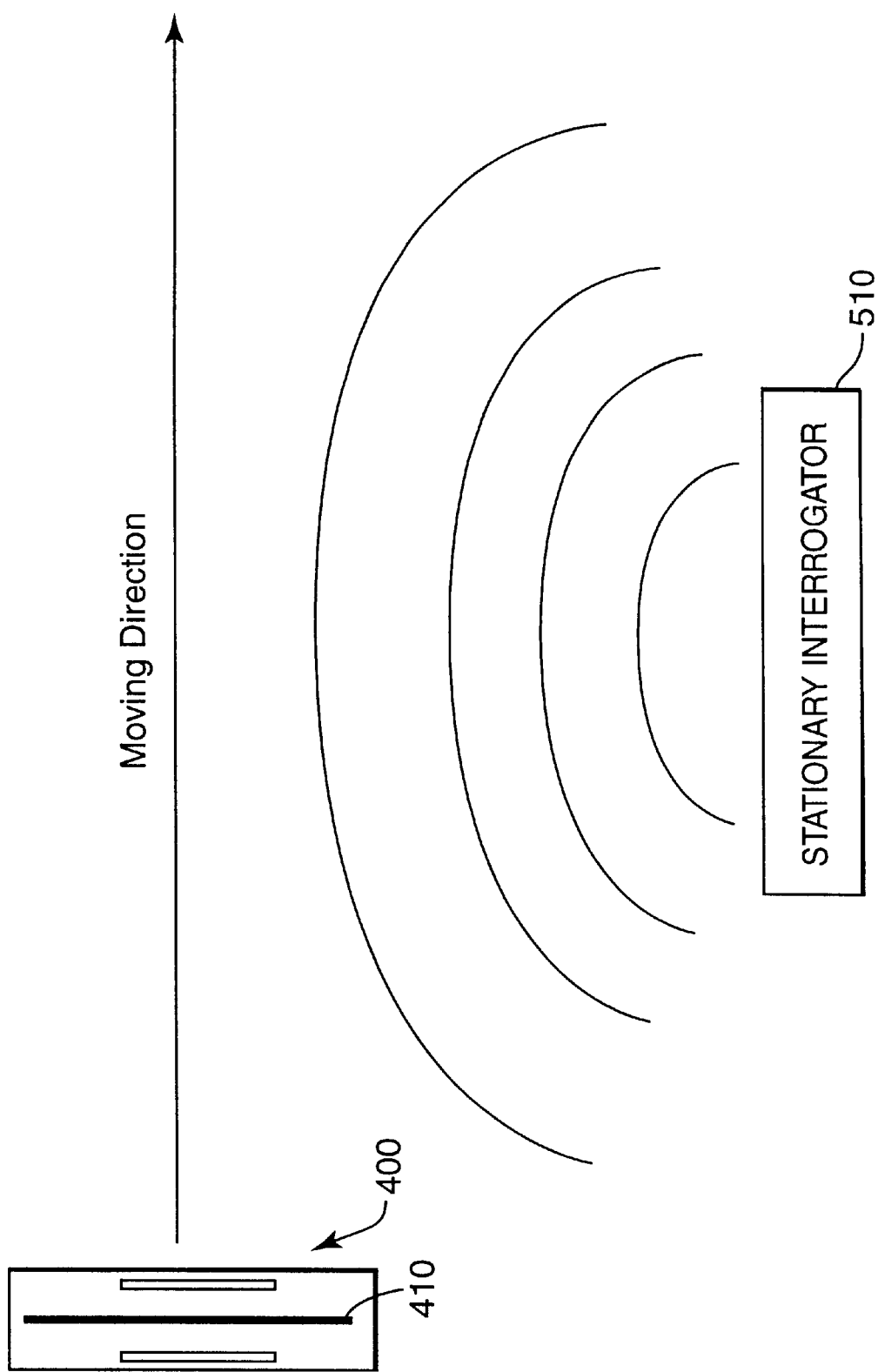
FIG. 6 illustrates an embodiment of the present invention that is similar in principle to the embodiment illustrated in FIG. 5, but instead has a stationary interrogator and moving RFID tags for determining relative position of the object to which the RFID tags are attached.

The same principle may be used in a slightly different arrangement, as shown in FIG. 6. In this case, a moving marker 400 moves past a stationary interrogator antenna 510. The precise moment when the RF shield passes by the antenna may be determined by the time sequence in which the two tags in the marker 400 are detected.

Differentiating Multiple RFID Tags

In situations where multiple RFID tags are within the detectable range of an interrogator, difficulties may arise if more than one tag responds to the interrogation signal. For example, suppose the vehicle approaches a target location marked by an RFID location tag but that there are other location tags also within the detection range of the interrogator and they also respond to the interrogation signal. Because the interrogator receives more than one response signal, the operator of the vehicle may be unable to determine if the target RFID tag is the closest to the vehicle. One solution would be to maintain low-power RF interrogation signals, thereby reducing the likelihood of having multiple tags within the detection range. But it also reduces significantly the detection range of the interrogator, thereby diminishing many of the advantages of using RFID tags.

Figure 7:
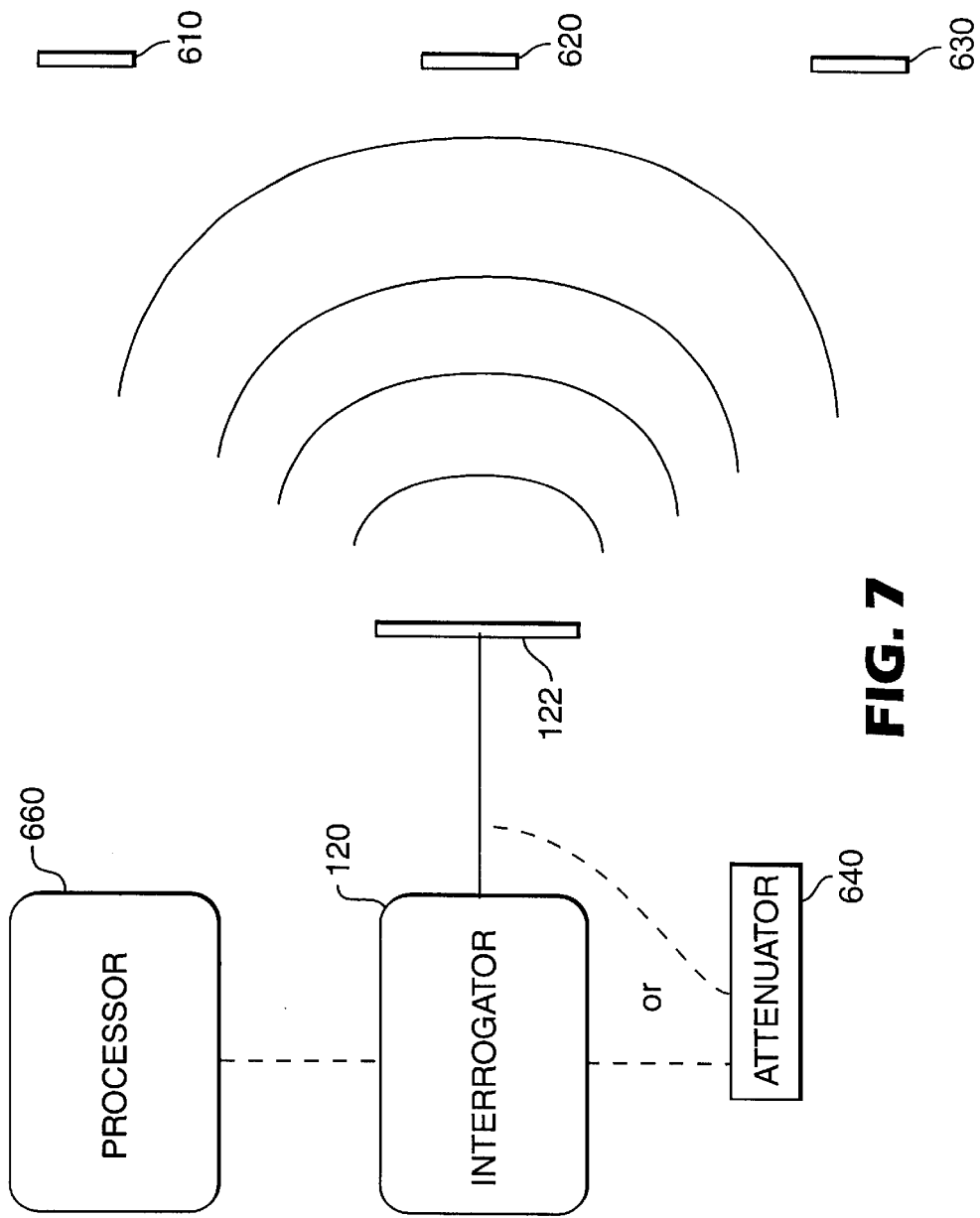
FIG. 7 illustrates an embodiment of the invention, wherein the RFID interrogator is configured and arranged to detect only the RFID tag that is the closest to the interrogator.
Figure 8:
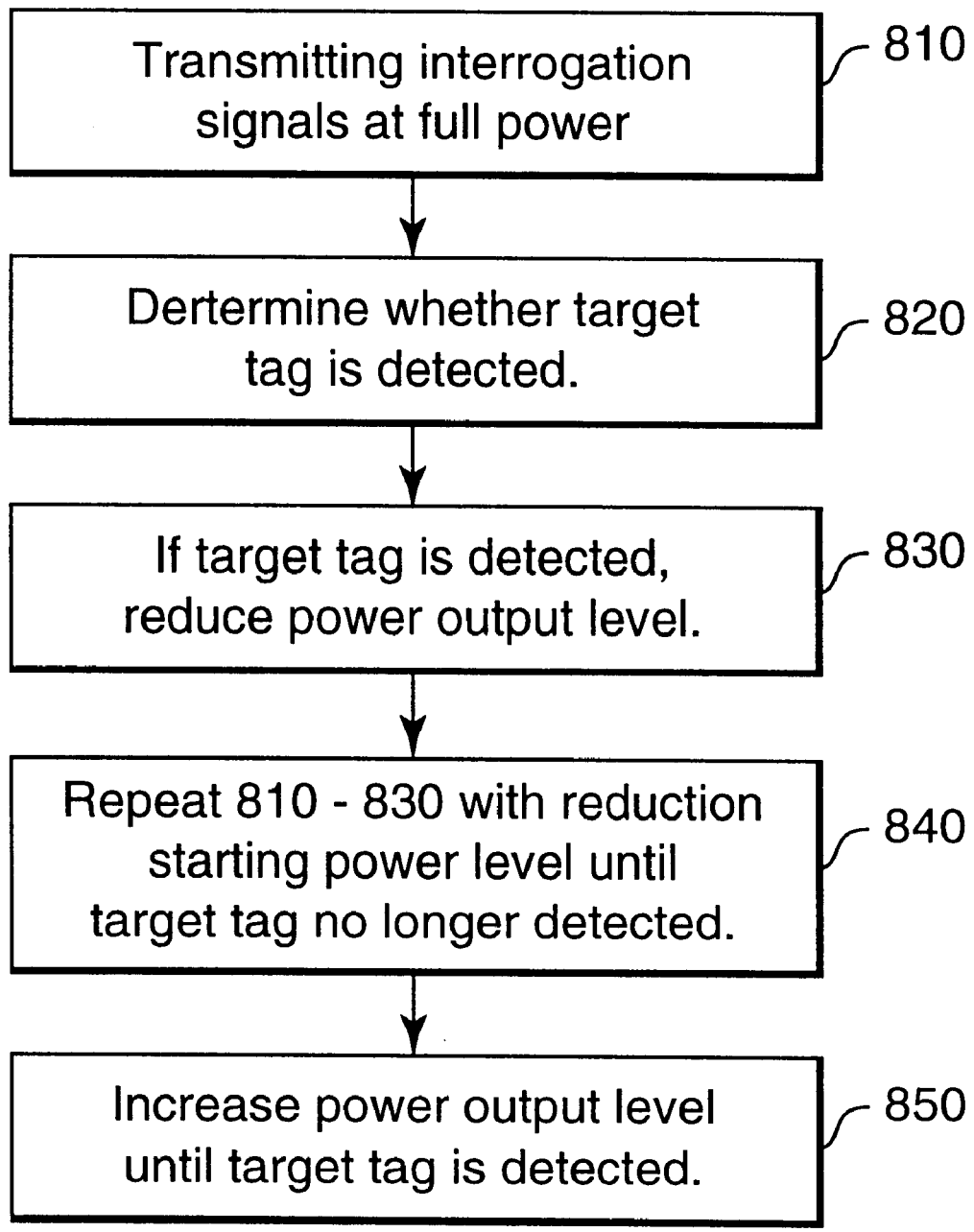
FIG. 8 illustrates a process of identifying an RFID tag the closest to the interrogator in accordance with an aspect of the invention.

This difficulty may be overcome, in accordance with one aspect of the invention, by dynamically attenuating the interrogation signals, namely, beginning interrogation by using interrogation signals of a high RF power level and reducing the power level to the threshold level for the target RFID tag to respond to the interrogation signals. As illustrated in FIG. 7, a system includes an interrogator 120, a processor 660, an antenna 122, and an attenuator 640. Tags 610, 620, and 630 are also shown. The attenuator, which is preferably a digital device, transmits stronger interrogation signals when the target tag 620 is further away than when the target tag 620 is closer. For an interrogator capable of varying output power, the attenuator is configured within the interrogator; for an interrogator of fixed output power, a digitally-controlled attenuator may be connected between the output of the interrogator and the antenna. As outlined in FIG. 8, the interrogator begins (810) by transmitting interrogation signals at full power and determines whether the target tag has been detected. If the target tag is detected (820), possibly together with other tags, the power of the interrogation signals is reduced by a predetermined factor or increment (830). If the target tag is still detected, the process is repeated from the beginning with a larger power reduction factor or larger power reduction increment until the target tag is no longer detected (840). Once the target tag is no longer detected, the power of the interrogation signals is increased back to the level of the previous step (850). Starting with a reduced power reduction factor or increment, the process is repeated from step 840. The preferred factor or increment can generally be empirically determined at the time the system is installed, based on the anticipated minimum spacing between adjacent tags.

The net effect of this procedure is that the RF power level of the interrogation signal keeps decreasing as long as the detection range is greater than the distance between the interrogator and the target tag and keeps increasing as long as detection range is smaller than the distance between the interrogator and the target tag. Thus, as the distance between the interrogator and the target tag changes, the power level of the interrogation signal is adjusted to "hunt" for the optimal level so that the detection range matches the distance.

A consequence of the dynamic attenuation system described herein is that the optimal RF power level of the interrogation signal is directly linked to the level of confidence that the interrogator is located next to the target tag: A low RF power level means a smaller detection range and thus a closer target tag and higher confidence level. Conversely, a high RF power level means a greater detection range and thus a more distant target tag and lower confidence level.

Figure 9:
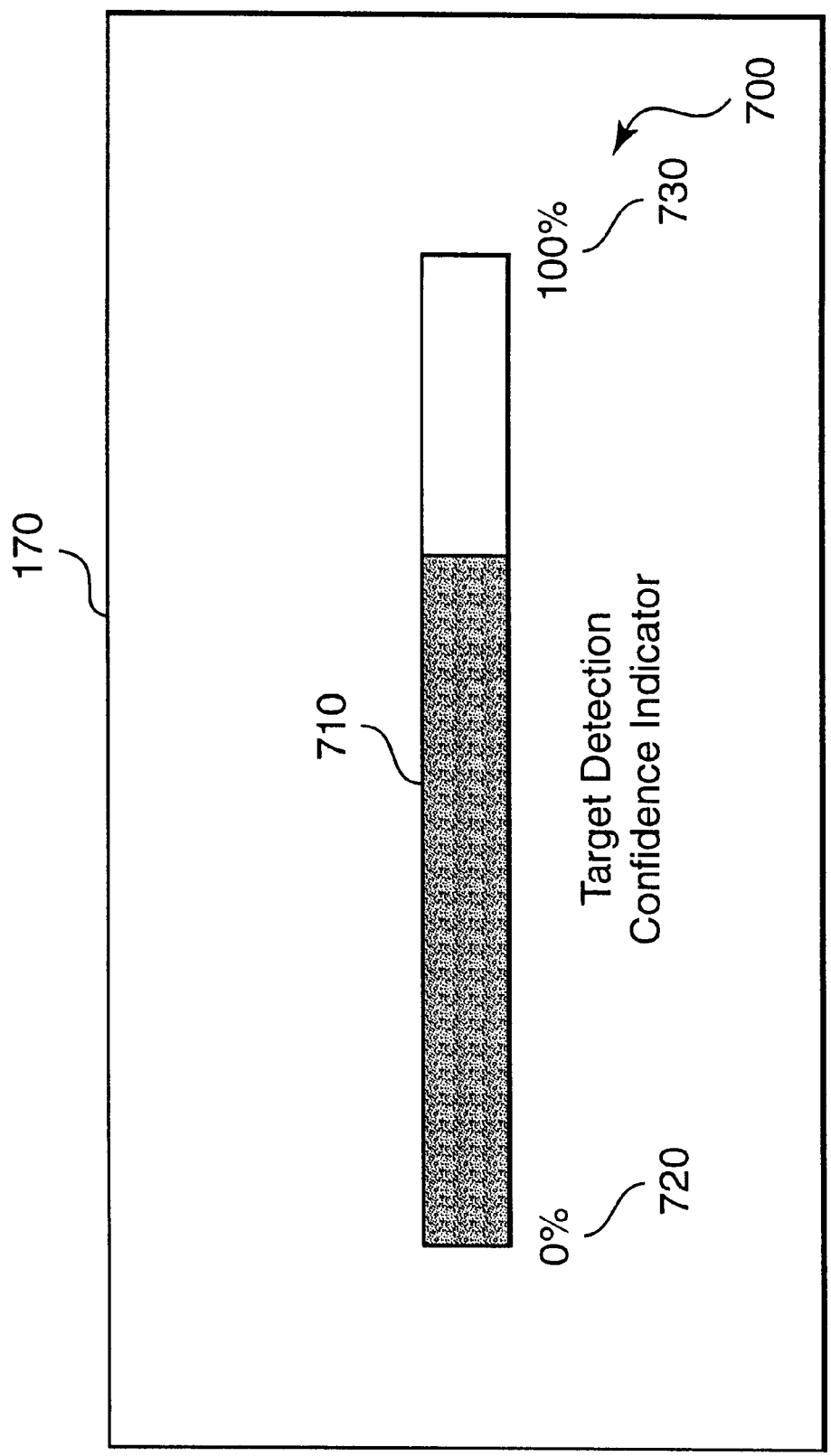
FIG. 9 illustrates a visual display of the confidence level in RFID tag identification provided by the embodiment shown in FIG. 7.

This feature may be used to provide a signal indicative of the distance between the interrogator and the target tag. For example, the output of a digital attenuator may be used to represent a function of the distance. Alternatively, in a variable-power interrogator, the output power may be set by a variable voltage at a control point in the interrogator. This voltage may be used as the signal indicative of the distance. The signal indicative of distance may in turn be used to generate a visual aid to the operator for approaching a target tag via a user interface. A graphical bar 700, such as that shown in FIG. 9, may be displayed on the onboard computer display 170 to represent the confidence level. The length of the bar 710 may be programmed to vary between a minimum position 720, corresponding to the highest RF power setting, and a maximum position 730, corresponding to the lowest RF power setting. Alternatively, the bar can be programmed to indicate the distance to the target tag. The bar length in this case then increases with RF power level. Numerous other possibilities exist, from a numerical display of confidence level of distance to a round dot pattern, the size of which being indicative of distance to the tag.

Alternatively, the confidence level indicator may be programmed to display a moving average calculated from the ratio between the count of target tags detected and the total count of all tags detected on successive reads.

An alternative dynamic attenuation system includes the same components as the system described above but is configured and arranged to repeat transmitting interrogation signals but continue reducing the power level of the interrogation signals as long as multiple RFID tags are detected, until only one RFID tag responds to the interrogation signals. Because the interrogation signal strength decreases with distance, the lone responding RFID tag is substantially the closest to the interrogator among multiple RFID tags.

Alternative/Additional Location Identification

The RFID tag-based system may be combined with other control and/or guidance systems to achieve the desired functionality. For example, magnetic tapes that can be applied to roads and warehouse floors for vehicle guidance may be used for location determination as an alternative or additional device to RFID location markers. Suitable magnetic tape is known in the art. An example of such tape is disclosed in the U.S. patent application Ser. No. 08/341,369 to Dahlin, et al. filed Nov. 17, 1994 and entitled "Conformable Magnetic Articles for Use With Traffic-Bearing Surfaces", which was published as WO 96/16231 and which is hereby incorporated herein by reference. In a system using such magnetic tape, the tape is laid on a traffic-bearing surface. A magnetic sensor mounted on the transport vehicle detects the magnetic signal when the sensor passes over a portion of the tape. Further, such tape may be magnetized ("encoded" or "written") in patterns indicative of the positions along the tape, so as to allow vehicle position determination upon reading the encoded information by the sensors on the vehicle. Such guidance system may be used in combination with RFID systems to achieve even greater operation efficiency.

Figure 10:
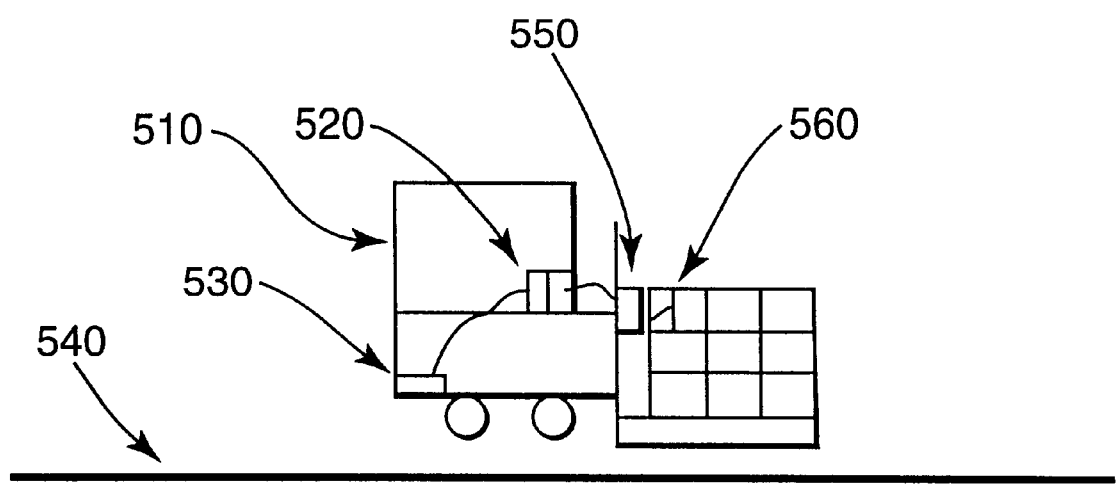
FIG. 10 illustrates an embodiment of the invention where RFID tags are used to identify objects, and magnetic tape is used to identify a location.

An example of such a system, in which pallets are stored in lanes demarcated on a warehouse floor, is shown in FIG. 10. A strip of such magnetic tape 540 may be laid along each lane. A vehicle 510 is equipped with both an RFID interrogator (which is shown integrated into processor 520) and a magnetic signal reader 530. The tape is encoded such that the position along the tape can be determined by the tape reader on the vehicle. For example, the magnetic pattern at a segment of the tape next to a stock location may be read as a numeric code that the processor recognizes as indicative of the location number corresponding to the stock location, such as a floor position. The processor receives location information from the tape via tape reader 530 and pallet identity information from the RFID tags (such as tag 560) via the interrogator and antenna 550. The processor also sends out instructions to the vehicle as to the tasks to be accomplished, including pallet pick-up coordinates, pallet number and pallet destination coordinates.

Figure 11:
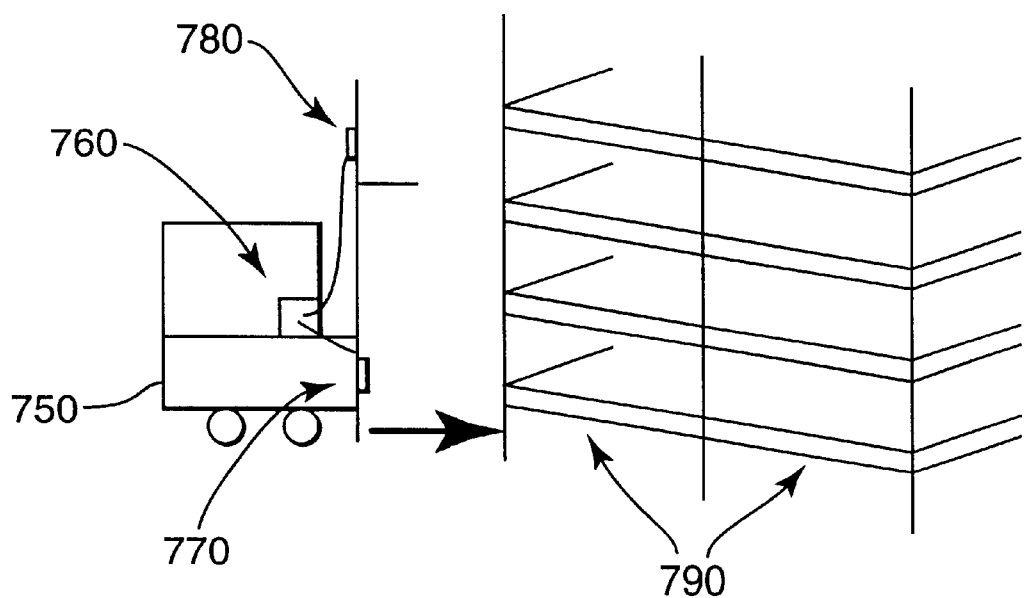
FIG. 11 illustrates an embodiment of the invention wherein a height sensor is used to identify particular slots within a storage rack marked by RFID tags.

Another example of possible operations with the invention is pallet movement involving not only horizontal vehicle movement but also vertical movement of pallets to and from slots in warehouse racks, as shown in FIG. 11. In such a system, the warehouse racks may be marked by RFID tags 790 as described above. As in the previous embodiments, vehicle 750 is equipped with an interrogator 760 and an antenna 770 that may be used to read tags 790 so as to identify a desired warehouse rack. In order to avoid the need to mark each slot in each warehouse rack with a separate location mark, it may be desirable to equip vehicle 750, which in this embodiment is a reach truck, with a height sensor 780. The vertical travel of the fork of the reach truck is monitored by the height sensor, which transmits a height signal to the processor or remote host computer. The height sensor is preferably a counter connected to the drive mechanism of the fork, but may be any other suitable device for measuring height, such as a linear displacement mechanism, laser range finder, etc. The processor may instruct the operator to raise the fork to a predetermined height to put away or retrieve from a shelf. The operator may manually control the raising of the fork to the height, or the lift truck may be programmed to automatically stop at the desired height. With such a system, the movement of inventory items in all three dimensions may be efficiently and accurately controlled. Moreover, using a height sensor on the forklift eliminates the need to place RFID sensors at each storage level (slot) in a vertically extending warehouse rack. Instead, each column of slots can be identified by a single RFID tag, with the individual slots within that column being identified by a height indicator.

The specific embodiments described above provide a fully automated system for identifying, moving and tracking objects throughout a warehouse or other similar environment. The system provides immediate feedback to the operator throughout the warehouse operations, thus minimizing the possibility for error. The system is adaptable for use with all of the wide variety of locations that are involved in warehouse operations, such as stocking locations, storage racks, floor lanes, and shipping docks. Because the system can operate in conjunction with a central data repository, the system can direct and track all object movement throughout the entire warehouse. By using the invention, errors in inventory management may be greatly reduced, and productivity thereby increased.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A system for tracking an object positionable at a plurality of locations, the system comprising:
   (a) a transport vehicle to move the object between locations;
   (b) an object marker associated with the object which stores information indicative of the identity of the object;
   (c) a plurality of location markers, each of which is positioned at one of a plurality of locations and stores information indicative of the location of the marker;
   (d) an interrogator mounted on the vehicle to receive from the object marker the information indicative of the identity of the object and from the location markers the intonation indicative of the location of the markers, the interrogator comprising a radio-frequency transmitter for transmitting information to be stored on a marker and a radio-frequency receiver; and
   (e) a processor on-board the vehicle and operatively connected to the interrogator, wherein the processor determines the identity of the object from the information indicative of the identity of the object, the location of at least one of the location markers from the information indicative of the location of the marker, and the spatial relationship between the object and the location.

2. The system of claim 1, wherein the radio-frequency transmitter transmits one or more interrogation signals;
   wherein each of the location markers comprises a radio-frequency identification tag to transmit a signal encoded with the information indicative of the location of the marker in response to one of the one or more interrogation signals;
   wherein the object marker comprises a radio-frequency identification tag to transmit a signal encoded with the information indicative of the identity of the object in response to one of the one or more interrogation signals; and
   wherein the radio-frequency receiver receives the signals from the location markers and object markers.

3. The system of claim 2, wherein the transmitter of the interrogator is further capable of transmitting a signal encoded with information and the object marker stores the encoded information.

4. The system of claim 2, wherein the interrogator further comprises a plurality of antennas to receive radio-frequency signals from a plurality of directions.

5. The system of claim 2, wherein the interrogator receives signals from a radio-frequency identification tag and generates a signal indicative of the distance between the interrogator and the tag.

6. The system of claim 5, wherein the interrogator varies the power level of the interrogation signal based on the distance between the interrogator and the tag.

7. The system of claim 5, wherein the interrogator generates a visual signal indicative of the distance between the interrogator and the tag.

8. The system of claim 2, wherein at least one of the location markers defines a plane, wherein the at least one of the location markers transmits a first signal indicating that the interrogator is located on one side of the plane and transmits a second signal indicating that the interrogator is located on the other side of the plane, and
   wherein the second signal is different from the first signal.

9. The system of claim 8, wherein the at least one of the location markers comprises two radio-frequency identification tags defining the plane therebetween to transmit signals indicative of the location in response to an interrogation signal of sufficient strength from the interrogator, and wherein the at least one location marker is configured and arranged to enable the tag on the same side of the interrogator to respond to the interrogation signal while preventing the other tag from responding to the interrogation signal.

10. The system of claim 9, wherein the at least one location marker further comprises a radio-frequency shield positioned between the two tags.

11. The system of claim 10, wherein the shield comprises a metal plate.

12. The system of claim 2, wherein the transport vehicle further comprises a lift capable of retrieving and positioning an object at a plurality of heights and a height sensor for measuring the height at which the object is positioned, and wherein the processor is operatively connected to the height sensor to determine the height at which the object is positioned.

13. The system of claim 2, wherein the transmitter of the interrogator is further capable of transmitting a signal encoded with information and at least one of the location markers stores the encoded information.

14. The system of claim 1, wherein each of the location markers comprises a radio-frequency identification tag to transmit a signal encoded with the information indicative of the location of the marker;
   wherein the object marker comprises a barcode containing the information indicative of the identity of the object;
   wherein the radio-frequency transmitter transmits an interrogation signal and the receiver receives the encoded signals; and
   wherein the interrogator further comprises a barcode reader that reads the barcode.

15. The system of claim 1, further comprising a signal generator operatively connected to the processor to provide to the operator of the vehicle a signal indicative of the location of one of the plurality of location markers when the interrogator receives from the location marker the information indicative of the location of the marker.

16. The system of claim 15, wherein the signal provided to the operator is an audible signal.

17. The system of claim 15, wherein the signal provided to the operator is a visual signal.

18. The system of claim 17, further comprising a computer display monitor, wherein the visual signal is a computer-generated pattern displayed on the monitor.

19. The system of claim 18, wherein the processor displays on the monitor instructions to the operator, the instructions including the identity of the object to be transported and at least one location to which the object is to be transported.

20. The system of claim 1, further comprising an additional interrogator mounted on the vehicle to receive from the object marker the information indicative of the identity of the object and from the location markers the information indicative of the location of the markers.

21. A system for tracking an object positionable at a plurality of locations on a traffic-bearing surface, the system comprising:
   (a) a transport vehicle to move the object between locations;
   (b) an object marker associated with the object which stores information indicative of the identity of the object;
   (c) a strip of magnetic tape associated with the traffic-bearing surface, wherein the magnetic tape includes a plurality of segments, wherein each of the segments is encoded with information indicative of the location of the segment and each of the segments produces a magnetic signal encoded with the information indicative of the location of the segment;
   (d) an interrogator mounted on the vehicle to receive from the object marker the information indicative of the identity of the object;
   (e) a magnetic signal reader mounted on the vehicle for sensing the signals generated by the magnetic tape; and
   (f) a processor operatively connected to the interrogator and the magnetic signal reader to determine the identity of the object from the information indicative of the identity of the object, the location of at least one of the segments of the magnetic tape and the spatial relationship between the object and the location.

22. A method of managing an object to be moved between locations in an environment wherein a first radio-frequency identification tag is affixed to the object and has stored therein and is capable of transmitting signals encoded with information indicative of the identity of the object, a second radio-frequency identification tag is affixed at a location and has stored therein and is capable of transmitting signals encoded with information indicative of the location of the second tag, and a transport vehicle is equipped with a radio-frequency identification tag interrogator, capable of receiving the signals from the tags and determining the information stored in the tags, the method comprising:
   (a) using the interrogator to receive the information indicative of the identity of the object;
   (b) determining a proposed location to which the object is to be moved;
   (c) using the vehicle to move the object to a location;
   (d) using the interrogator to receive the information indicative of the location; and
   (e) depositing the object at the location when the location indicated by the information received in step (d) matches the proposed location.

23. The method of claim 22, further comprising the step of determining a proposed identity of the object, wherein the step (c) is performed only when the identity indicated by the information received in step (a) matches the proposed identity of the object.

24. The method of claim 22, further comprising providing an operator operating the transport vehicle with visual displays of instructions including the proposed identity of the object and proposed location.

25. The method of claim 24, wherein providing visual display comprises displaying the instructions on a computer screen.

26. The method of claim 25, wherein displaying on a computer screen comprises displaying through a graphical user interface.

* * * * *

UNITED STATES PATENT AND TRADEMARK OFFICE
CERTIFICATE OF CORRECTION

PATENT NO.    : 6,600,418 B2
DATED         : July 29, 2003
INVENTOR(S)   : Francis, Robert C.

It is certified that error appears in the above-identified patent and that said Letters Patent is hereby corrected as shown below:

<u>Column 13,</u>
Line 29, "intonation" should read -- information --.

Signed and Sealed this

Ninth Day of March, 2004

JON W. DUDAS
*Acting Director of the United States Patent and Trademark Office*